United States Patent Office 3,642,988
Patented Feb. 15, 1972

3,642,988
NEMATICIDAL PHOSPHORYLATED BENZOFURAZANS
Johannes Th. W. Montagne and Christopher L. Dunn, Kent, England, assignors to Shell Oil Company, New York, N.Y.
No Drawing. Filed Jan. 15, 1969, Ser. No. 791,490
Claims priority, application Great Britain, Jan. 25, 1968, 3,433/68
Int. Cl. A01n 9/36
U.S. Cl. 424—200                3 Claims

ABSTRACT OF THE DISCLOSURE

Protection of crops against attack by nematodes is afforded by treating the nematodes with a phosphorylated benzofurazan.

BACKGROUND OF THE INVENTION

This invention relates to the use of phosphorylated benzofurazans as nematicides. More specifically, this invention relates to the use of benzofurazan esters of dialkyl acid phosphates and phosphorothionates as nematicides.

The control of nematodes has become an integral part of agricultural practice. There is a constant need for the development of improved and increasingly effective nematocides. It is an object of the present invention to provide an effective method for nematode control.

British Pat. 1,054,068 describes the insecticidal use of novel phosphorylated benzofurazan compounds having the general formula:

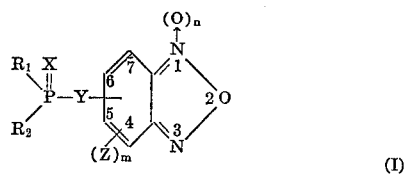

(I)

wherein $R_1$ and $R_2$, which may be the same or different, each represents an alkyl or alkoxy group of 1–4 carbon atoms; X and Y, which may be the same or different, each represents an oxygen or sulphur atom with the proviso that when X is an oxygen atom, Y also is an oxygen atom; Z represents an alkyl group having 1–4 carbon atoms, chlorine, bromine or a nitro group; $n$ and $m$ are each 0 or 1; with the proviso that when $n$ is 1, $m$ is 1 and Z is a nitro group.

A specific small group of novel compounds within the above general formula I were found to have a particularly wide spectrum of insecticidal activity, coupled with a low mammalian toxicity, as taught by British Pat. No. 1,070,095, which claims novel phosphorylated benzofurazan compounds having the general formula:

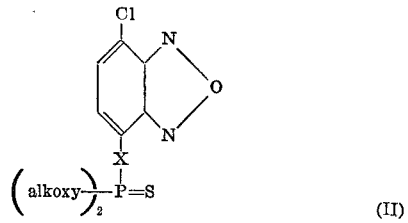

(II)

wherein X represents an oxygen or sulphur atom, and each alkoxy group contains 1–10, preferably 1–4 carbon atoms.

The above-mentioned British patents teach the compounds and also pesticidal compositions containing the compounds in association with a carrier and/or surface-active agent, and methods of combatting insects and improving crop yields by the use of such compositions.

It has now been found that the above mentioned phosphorylated benzofurazans possess not only insecticidal activity, but also nematicidal activity.

Accordingly, the present invention provides a method of protecting crops against attack by nematodes, in which crops subject to or subjected to such attack, or soil in which such crops are growing or are to be grown, are treated with a nematicidally effective amount of a phosphorylated benzofurazan composition. This comprises a nematicidally acceptable carrier or surface-active agent, or both such a carrier and such a surface-active agent, together with, as active ingredient, at least one phosphorylated benzofurazan of the formula:

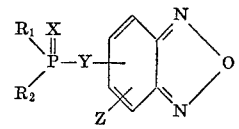

(III)

wherein $R_1$ and $R_2$, which may be the same or different, each represents an alkyl, or an alkoxy group of 1–4 carbon atoms; X and Y, which may be the same or different, each represents an oxygen or sulphur atom, Y preferably representing an oxygen atom, with the proviso that when X represents an oxygen atom, Y is also an oxygen atom; and Z represents a nitro group or, preferably, a hydrogen, chlorine or bromine atom or an alkyl group of 1–4 carbon atoms.

Particularly preferred compounds for use as the active ingredient in the method of this invention are those of the formula:

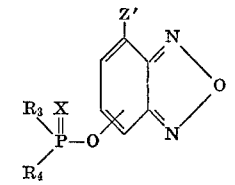

(IV)

wherein $R_3$ and $R_4$ each represents an alkoxy group of 1–4 caron atoms; X represents an oxygen or sulphur atom, the phosphoryl substitutent being located at the 4 or 5 position; and Z' represents a hydrogen or chlorine atom or a methyl group. The most nematicidally active compound so far located, and hence the most preferred compound of the invention, is 4 - diethoxyphosphinothioyloxy-7-chlorobenzofurazan.

The compounds of the invention may be prepared by reacting a compound of the formula:

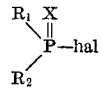

wherein $R_1$, $R_2$ and X have the meanings hereinbefore described, and hal represents a chlorine or bromine atom, with a compound having the formula:

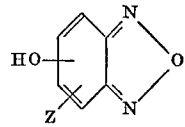

wherein Z is as hereinbefore described, in the presence of a base, preferably an alkali or alkaline earth metal carbonate, or a nitrogenous base, for example, pyridine, lutidine or, preferably, triethylamine.

The above reaction is preferably carried out in a liquid inert reaction medium which may be a solvent for the reactants or for the desired products or, preferably, for both. Aliphatic ketonic solvents such as acetone, methyl ethyl ketone and methyl isobutyl ketone are especially suitable for this purpose. Other suitable reaction media are, for example, benzene, diethyl ether, diisopropyl ether, tetrahydrofuran, chloroform, and carbon tetrachloride. The reactants and the base are preferably employed in substantially equimolar amounts. The reaction may be carried out at a temperature between 0 and 150° C., preferably between 50 and 100° C.

The reaction mixture obtained may be worked up in any conventional way. Thus, where the reaction has been effected in the presence of a water-miscible solvent such as acetone, the reaction mixture may be poured into water and the reaction product extracted with a suitable solvent, for example, ether, chloroform, methylene chloride, or benzene. Alternatively, the reaction mixture may be filtered to remove precipitated halide, the solvent may then be distilled off, and the residual product taken up in a water-immiscible solvent as mentioned above. The solution is then washed with water, and, if desired, with a dilute aqueous solution of an alkali, for example, sodium bicarbonate or sodium hydroxide, and again with water, dried and the solvent removed. In many cases the product obtained in this way is sufficiently pure. However, if desired, it may be purified, for instance, by recrystallization from a suitable solvent, such as cyclohexane or petroleum ether or by means of chromatography, for instance on a silica gel column.

The phosphorylated benzofurazans have been found to be effective killers of soil-dwelling nematodes—that is, the unsegmented roundworms of the class Nematoda, also known as eelworms, which customarily inhabit soil and feed upon the roots of plants growing therein. Included are the cyst forming nematodes of the genus Heterodera (e.g. the golden nematode [*Heterodera rostochiensis*]), the stubby root nematodes of the genus Trichodorus, the bulb and stem nematodes of the genus Ditylenchus, the root knot nematodes of the genus Meloidogyne, the root-lesion nematodes of the genus Pratylenchus, the citrus nematodes of the genus Tylenchulus, the sting nematodes of the genus Balonolaimus, and the plant-parasitic nematodes of such genera as Nacobus, Radopholus, and the like.

These benzofurazan derivatives are employed for the destruction of nematodes in soil by disseminating the compounds in the nematode-infested soil, in nematocidally-effective concentrations. Judging by the experimental work which has been performed, the nematocidally effective concentrations of these benzofurazans in the soil lie within the range of from about 1 to about 500 parts per million, on a weight basis based on the weight of the air-dry soil, with the usual dosage ranging from about 4 to about 20 parts per million, on the same basis. As a practical matter, the effective dosage generally amounts to from about 1 to about 100 pounds of the nematicide per acre of land, depending upon the depth of soil to be treated, which may be up to 6, or 8, or even 12 inches, depending upon the particular species of plants and nematodes involved. Generally, dosages of from about 2 to about 40 pounds of the nematicide per acre of land are preferred.

Some of the phosphorylated benzofurazans are solids at ordinary room temperature. These may be applied to the soil neat—as by grinding the solids, then admixing the resulting dust or powder with the soil to be treated. Alternatively, the benzofurazans may be dissolved in a suitable liquid diluent and the solution applied to and mixed with the soil, or the compounds may be formulated with a suitable solid carrier and applied as a dust, powder or as granules to the soil and admixed therewith. These benzofurazans are not, in general, very soluble in water, so that water is not often a suitable solvent. By the use of suitable emulsifying and dispersing agents, however, the benzofurazans can be emulsified and dispersed in water and the emulsion applied to the soil to be treated to provide effective control of the nematodes therein. Any of the usual emulsifying and dispersing agents commonly employed in forming aqueous emulsions and suspensions of water-insoluble materials can be used for this purpose. Generally only a small concentration of the emulsifying agents is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5 percent of the weight of the formulation. Alternatively, or in addition, in some cases it may be to advantage to dissolve the benzofurazans to be used in a solvent which can readily be dispersed in water to produce a heterogeneous dispersion of the nematicide in the water.

Where the benzofurazan nematicide is to be applied as a solution, suitable solvents include alcohols, ketones and hydrocarbons, such as, for example, isopropyl alcohol, benzene, acetone, methyl ethyl ketone, secondary butyl alcohol, kerosine, chlorinated hydrocarbons, various non-phytotoxic hydrocarbon fractions which are ordinarily used in disseminating agricultural chemicals, including spray oils, horticultural oils, and the like.

The suitable solid carriers ordinarily are those which are essentially inert in the soil and which are not hygroscopic—for if they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable inert carriers are those well known to the art including the clays such as the kaolinites, the bentonites and the attapulgites; other minerals in natural state such as talc, pyrophyllite, quartz, diatomaceous earth, fuller's earth, chalk, rock phosphate and sulphur; and chemically modified minerals, such as acid washed bentonites, precipitated calcium phosphates, precipitated calcium carbonate, and colloidal silica. These diluents may represent a substantial portion; for example, 50 to 98 percent by weight of the entire formulation.

These solid formulations can be prepared by grinding or airmilling the carrier and nematicide together. Alternatively, the solid formulations can be formed by dissolving the nematicide in a suitable solvent, such as a volatile solvent, impregnating and/or coating the particles with the solution and if necessary, removing the solvent. The formulation also can be effected by melting the nematicide and mixing the molten nematicide with the carrier. Granular formulations can be prepared by impregnating and/or coating granules of the carrier with the nematicide or by forming granules of mixtures of the nematicide and carrier.

From the standpoint of mechanics, the nematicide, neat or as a formulation, is applied to the soil in any manner which enables an intimate admixture with the soil to be obtained. Thus the nematicide, which includes formulations thereof, can be applied to the surface of the soil, or it can be applied below the surface of the soil, and then admixed with the soil. If in the form of a liquid formulation, the nematicide can be drenched onto the surface of the soil or injected into the soil. In other, conventional means, well known in the art, can be used to effect intimate admixture of the nematicide with the soil to be treated.

The phosphorylated benzofurazans are characterized by a good effective life in the soil. Consequently, it may not in all cases be necessary to treat the entire mass of nematode-infested soil—in some cases it may be sufficient to treat only the soil of the rhizosphere of the plants to be protected. Thus, the soil immediately surrounding the roots of established trees can be treated to protect the trees, and row crops can be protected by treating only the soil which will surround the roots of the plants before the seeds or plants are planted, or after the plants have been planted. The formulations of the nematicides may also contain other materials, such as insecticides, fungicides, nematicides or different action and/or different physical characteristics, hormones, and/or fertilizers, to form multipurpose compositions.

The effectiveness of the phosphorylated benzofurazans as nematicides is demonstrated by the following tests.

EXAMPLE I.—IN VITRO TESTING

*Meloidogyne incognita* (root knot nematode) larvae were extracted from macerated tomato roots over a 48 hour period, allowed to settle and resuspended in distilled water. 0.5 ml. aliquots were mixed with an equal volume of a known concentration of toxicant and incubated overnight at 23° C. before assessing the percent of dead larvae. $LD_{90}$ values were obtained by plotting this value against toxicant concentration. The replicates were then bulked and added to two pots of sterile loam in which young tomato seedlings were planted. After four weeks incubation the plants were uprooted and examined for infection The percentage control is given in Table 1.

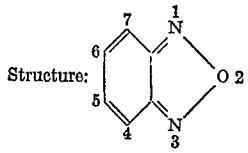

Structure:

| Structure: substituents present | | | In vitro $LD_{90}$ | Percent control in vivo of in vitro treated larvae at— | |
|---|---|---|---|---|---|
| 4 | 5 | 7 | | 500 p.p.m. | 100 p.p.m. |
| | $(EtO)_2PO.O-$ | | 100 | | 80 |
| | $(MeO)_2PS.O-$ | | <50 | 45 | |
| | $(Me)_2PS.O-$ | | >100 | | 20 |
| | $(Et)_2PS.O-$ | | >50 | | |
| $(MeO)_2PS.O$ | | | 100 | | 60 |
| Cl | $(MeO)_2PS.O-$ | | 100 | 37 | |
| Br | $(MeO)_2PS.O-$ | | >100 | | 0 |
| | $(MeO)_2PS.O-$ | Me | 50 | | 60 |
| | $(EtO)_2PO.O-$ | Me | 50 | 12 | |
| $(EtO)_2PO.O-$ | | | <50 | | 100 |
| $(EtO)_2PS.S-$ | | $NO_2$ | >100 | | 0 |
| $(MeO)_2PS.S-$ | | $NO_2$ | >100 | | 40 |
| $(EtO)_2PO.O-$ | | Cl | <50 | | 80 |
| $(EtO)_2PS.O-$ | | Cl | <50 | 78 | 80 |

EXAMPLE II.—IN VIVO SOIL MIX TESTING

Compounds were crushed, mixed with a small quantity of china clay before being mixed with loam infested with *M. incognita*. The treated soils were kept in closed jars for a week, allowed to aerate for 24 hours (allowing evaporation of volatile substances) and then planted with young tomato seedlings. After 4 weeks incubation the roots were examined as above. The results are shown in Table 2 below.

TABLE 2

| Compound | Percent control in soil mix test for— | |
|---|---|---|
| | 20 p.p.m. | 10 p.p.m |
| 5-dimethoxyphosphinothioyloxy benzofurazan | 19 | 0 |
| 5-diethylphosphinothioyloxy benzofurazan | 0 | 37 |
| 5-dimethoxyphosphinothioyloxy-4-bromo-benzofurazan | 19 | 6 |
| 5-dimethoxyphosphinothioyloxy-7-methyl benzofurazan | 12 | 37 |
| 5-diethoxyphosphinyloxy-7-methyl benzofurazan | 12 | 6 |
| 4-diethoxyphosphinyloxy benzofurazan | 12 | 0 |
| 4-diethoxyphosphinothioyloxy-7-chloro benzofurazan | | 100 |

EXAMPLE III

A soil infected with *M. incognita* was treated with 4-diethoxyphosphinothiolyoxy - 7 - chlorobenzofurazan. The treated soils were allowed to incubate for a two and four week period and then planted with young tomato plants. Five weeks after planting the roots were examined for infestation. The results are given in Table 3 below.

TABLE 3

| Conc of active compound grams/quart (p.p.m.) | Percent control after— | |
|---|---|---|
| | 2 weeks | 4 weeks |
| .04 | 100 | 100 |
| .01 (8 p.p.m.) | 100 | 100 |
| .002 (1.6 p.p.m.) | 79 | 86 |
| .001 (>1 p.p.m.) | 50 | 86 |

EXAMPLE IV

A soil infested with *Heterodera schachtii* (sugar beet nematode) was treated with 4-diethoxyphosphinothioyloxy-2 chlorobenzofurazan. The treated soils were allowed to incubate for two and four week periods and then planted with young sugar beet plants. Five weeks after planting, the roots were examined for infestation. The results are given in Table 4 below.

TABLE 4

| Conc of Active Compound grams/quart (p.p.m.) | Percent control after— | |
|---|---|---|
| | 2 weeks | 4 weeks |
| .04 | 93 | 100 |
| .04 | 100 | 100 |
| .01 (8 p.p.m.) | 94 | 96 |

We claim as our invention:

1. A method of controlling nematodes on crops which comprises applying to the nematodes a nematicidally effective amount of a compound of the formula:

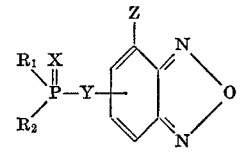

wherein $R_1$ and $R_2$, which may be the same or different, each represents alkyl or alkoxy having 1 to 4 carbon atoms, X and Y, which may be the same or different, represent oxygen or sulfur with the proviso that when X is oxygen Y is oxygen, and Z represents hydrogen, nitro, chlorine, bromine or alkyl containing from 1 to 4 carbon atoms.

2. A method according to claim 1 wherein the compound has the formula:

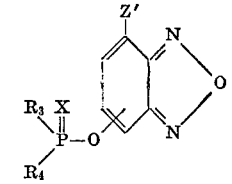

wherein $R_3$ and $R_4$ each represents alkoxy of 1 to 4 carbon atoms, X is oxygen or sulfur and Z' is a member of the group consisting of hydrogen, chlorine and methyl.

3. The method according to claim 2 wherein the compound is 4 - diethoxyphosphinothioyloxy-7-chlorobenzofurazan.

References Cited

FOREIGN PATENTS 1,054,068  1/1967  Great Britain.
1,070,095  5/1967  Great Britain.

ALBERT T. MEYERS, Primary Examiner

A. J. ROBINSON, Assistant Examiner